Patented Feb. 27, 1940

2,192,125

UNITED STATES PATENT OFFICE 2,192,125

PROCESS FOR PREPARING IMPROVED HYDROGENATION CATALYSTS IN LUMP FORM

Cecil L. Brown and William H. Jones, Baton Rouge, La., assignors to Standard-I. G. Company No Drawing. Application December 29, 1937, Serial No. 182,372

3 Claims. (Cl. 23—236)

This invention relates to methods for preparing improved catalysts and to the resulting compositions and more particularly to the preparation of catalyst tablets of increased durability from tablets containing catalytic substances such as the sulfides of metals of group VI.

It has already been proposed to prepare catalysts containing compounds of metals of group VI which are suitable for use in the hydrogenation, destructive hydrogenation, and dehydrogenation of carbonaceous materials, particularly coal, lignite, peat, petroleum, and their distillation and conversion products. Many of these catalysts are pressed into small tablets by means of tableting machines under pressures of the order of several tons per square inch. While the tablets initially are hard and strong, they soften when wet with organic liquids and when used in the hydrogenation processes.

An object of this invention is to prepare catalyst lumps or tablets having, among other advantages, improved strength and durability and resistance to softening when wet and when used in the hydrogenation process. Other and further objects will be apparent from the following description and the claims.

It has now been found that if these tablets are heated for a substantial period of time to a temperature of the order of about 250 to 600° F. in a vacuum or other non-reactive atmosphere of gases of low molecular weight, such as hydrogen, methane, and nitrogen, the strength and durability of the tablets are greatly increased, although the chemical composition of the catalyst is not appreciably changed. The tablets thus heated are much more resistant than before to the softening action of organic liquids and retain their form to a much greater extent than before when used as catalysts in the hydrogenation and destructive hydrogenation of hydrocarbon oils and vapors.

The following examples are presented to illustrate suitable methods for carrying out this treatment but are not intended in any way to limit the invention described herein:

Example I

Molybdenum trisulfide was precipitated from an aqueous solution of ammonium thiomolybdate by slow addition of dilute sulfuric acid. The precipitate was washed and dried with exclusion of air and was then heated in hydrogen at about 800° F., being thereby reduced substantially completely to molybdenum disulfide. This product was then formed into tablets ⅜" in diameter by means of a tableting machine at a pressure of the order of several tons per square inch.

These tablets shattered quickly when wet with carbon disulfide at room temperature. They also shattered, somewhat more slowly, when wet with benzene. On heating another portion of the tablets in a petroleum gas oil for 3 hours at 500° F., the tablets became so soft that they could be easily deformed by pressing between the fingers.

A separate portion of the tablets was heated at atmospheric pressure in an atmosphere of Louisiana natural gas (substantially pure methane containing about 7% nitrogen) at 500° F. for 16 hours. These heat treated tablets did not crack when wet with carbon disulfide or with benzene. On heating in gas oil for 3 hours at 500° F. they remained hard and could not be deformed with the fingers. These tablets which had been subjected both to the heat treatment and to the subsequent heating in gas oil, were tested for compressive strength by placing a tablet between parallel metal surfaces and slowly applying pressure until the tablet cracked, the average maximum pressure reading for several tablets being taken as the compressive strength. These tablets showed a side strength of 16 pounds and an end strength of 350 pounds per tablet.

Example II

Other tablets of the same catalysts as prepared in Example I were heated in hydrogen at a pressure of 3,000 pounds per square inch for 16 hours at 251° F. The resulting tablets were hard and did not crack on being wet with liquids. After heating in gas oil for 3 hours at 500° F., these tablets showed side compressive strength of 65 pounds and end compressive strength of 340 pounds per tablet.

Example III

Other tablets of the same catalysts prepared as described in Example I were heated in hydrogen at a pressure of 3,000 pounds per square inch for 16 hours at 450° F. The resulting tablets were hard and did not crack on being wet with liquids. After heating in gas oil for 3 hours at 500° F., they showed side compressive strength of 81 pounds and end compressive strength of 372 pounds per tablet.

Example IV

Tungsten disulfide, prepared by decomposition of $(NH_4)_2WS_4$ by heat, was formed into tablets ⅛" in diameter in the same tableting machine described in Example I. These tablets were then crushed to powder and re-tableted. A portion of these tablets was heated in gas oil for 3 hours at 500° F. whereupon all shattered.

Another portion of the tablets was heated in Louisiana natural gas at atmospheric pressure for 16 hours at 500° F. The resulting tablets were hard and did not crack on being wet with liquids. After heating in gas oil for 3 hours at 500° F., the tablets showed a side compressive strength of 108 pounds and an end compressive strength of 380 pounds per tablet.

Example V

Tablets of a molybdenum disulfide catalyst were prepared from precipitated molybdenum trisulfide according to the method described in Example I. A portion of these tablets was heated in hydrogen for 16 hours at 400° F. and 1,000 pounds per square inch pressure. The two portions of catalysts, with and without the preheating treatment, were then used in the destructive hydrogenation of petroleum gas oil at a temperature of about 700° F. and a pressure of 3,000 pounds per square inch used a feed rate of 2 volumes of oil per volume of catalyst per hour with 12,000 cubic feet of hydrogen gas per barrel of oil. Compressive strength tests on the catalyst tablets after operation under these closely comparable conditions showed that the untreated tablets lost 76% of their strength in 333 hours, while the preheat treated tablets lost only 15% of their strength in 887 hours.

The preheating temperature used in the process of this invention is above about 250° F., and is preferably somewhat higher when the heat treatment is conducted with gases under pressure. This temperature should not be so high as to cause any appreciable change in either the chemical composition or the appearance of the tablets. For example, reduction by the action of reducing gases, or sintering, are to be carefully avoided. Temperatures up to 450 to 500° F. may be used with reducing gases such as hydrogen, and temperatures up to 600° F. or even somewhat higher may be used with less active gases such as methane.

The heat treatment is preferably conducted for a time of the order of several hours, although the time may be somewhat shorter, particularly when the treatment is conducted in a stream of gas under reduced pressures. Longer times are not harmful, but few additional advantages are gained in their use.

The treatment may be conducted at any desired pressure from a high vacuum up to pressures of the order of several hundred atmospheres. In general, the treatment may be satisfactorily conducted at relatively low temperatures when reduced pressures are used, while relatively higher temperatures are preferred when the treatment is carried out under pressure.

This treatment has been found to be particularly advantageous in the preparation of catalysts containing sulfur compounds of metals of group VI, particularly of molybdenum and tungsten. While the treatment has been described in the above examples with reference to catalysts consisting substantially completely of these compounds, it may also be used in the preparation of catalysts containing mixtures of the sulfur compounds of the metals of group VI with other catalytically active agents, promoters, and carriers. For example, a catalyst may contain a mixture of sulfur compounds of metals of group VI and of the iron group, particularly nickel and cobalt. Such catalysts may consist initially of compounds in which the metal of group VI forms a part of the acid radical, such as in nickel tungstate. These compounds in which the acid radical consists of oxygen-acids, are then preferably sulfurized by suitable means, such as by heating in hydrogen sulfide, until the oxygen is partly or wholly replaced by sulfur. The resulting sulfurized nickel tungstate, for example, may then be tableted and the tablets are then improved in durability and use by subjecting them to the heat treatments described herein.

This invention is not to be limited by any specific examples, explanation, or theories of the operation thereof, all being presented herein solely for purpose of illustration, but is to be limited only by the following claims in which it is desired to claim all novelty insofar as the prior art permits:

We claim:

1. In the process of making catalyst adapted to change the carbon-hydrogen ratio of organic compounds wherein a mass consisting essentially of group VI sulphide is compressed under a pressure of the order of several tons per square inch into a molded product; a method of improving the mechanical strength of the molded product which comprises maintaining said product at a temperature of between about 250° F. and 600° F. for a time of the order of several hours, in an inert atmosphere.

2. The invention defined in claim 1 wherein the length of the heat treating time is about 16 hours.

3. The invention defined in claim 1 wherein the temperature of the heat treatment is about 500° F.

CECIL L. BROWN.
WILLIAM H. JONES.